UNITED STATES PATENT OFFICE.

HARRY F. FRENCH, OF FREMONT, OHIO, ASSIGNOR, BY MESNE ASSIGNMENTS, TO NATIONAL CARBON COMPANY, INC., A CORPORATION OF NEW YORK.

ELECTRIC BATTERY.

1,357,160.

Specification of Letters Patent.  Patented Oct. 26, 1920.

No Drawing.   Application filed February 17, 1916.  Serial No. 78,848.

*To all whom it may concern:*

Be it known that I, HARRY F. FRENCH, a citizen of the United States, residing at Fremont, in the county of Sandusky and State of Ohio, have invented a certain new and useful Improvement in Electric Batteries, of which the following is a full, clear, and exact description.

This invention relates to electric batteries. In most galvanic cells the electrolyte becomes less acid or more basic as the soluble electrode material is consumed or reacted with. Among many ways in which such a tendency toward basicity in the electrolyte can be detrimental, some of the most important are reduction of the electromotive force and the precipitation of insoluble material which clogs the cell. A typical and very common behavior is obtained when zinc is used as the anode of a primary cell containing an aqueous electrolyte, and in which hydrogen either escapes at the cathode or is oxidized there to water. Under these conditions, unless some material is present to act like the ones herein described, that zinc which remains dissolved in the electrolyte renders it more basic, or reduces its acidity. In many cases, especially when the usual attempt is made to gain the great advantages which accrue through the use of the minimum amount of electrolyte, it happens that such basicity causes the precipitation of insoluble materials. This formation is very detrimental, since by clogging the action of the cell it generally establishes the limit of the output capacity of a cell of given size by determining the minimum amount of electrolyte necessary for a unit of output capacity. This is particularly true of the ordinary dry cell containing a depolarizing mix of pyrolusite and carbon with an electrolyte of ammonium chlorid, but it is evident that cells containing combinations of other materials can be greatly improved by eliminating this tendency toward basicity, and I have found that many classes of organic compounds can be used for this purpose.

These organic compounds may act in various ways, the principal ones of which follow:—

1. Reduction of the organic compound by hydrogen to form an acid with such hydrogen.

2. The absorption, by the organic compound, of one or more materials which are capable of forming a base with the hydroxyl group or with water.

3. The absorption by the organic material of one or more hydroxyl groups with the simultaneous freeing from itself of one or more materials which are capable of forming an acid with hydrogen.

4. The use of a compound containing an organic base whose basicity is less than that of the material thrown into the electrolyte by the dissolving of the cell anode.

There are many reasons why organic materials are particularly suited to the purpose at hand, chief among them are the facts that so many degrees of solubility and stability are obtainable, and that the properties are so susceptible to control through variation of the groups contained, or of the molecular structure.

1. Among the individuals and classes of compounds which are useful through forming an acid through reduction by hydrogen are carbon tetrachlorid, chloroform, acetylene tetrachlorid, trichlorphenol and the like. Their typical reaction when used in the manner named is shown by the following reactions for the complete reduction of carbon tetrachlorid.

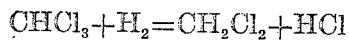
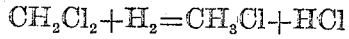
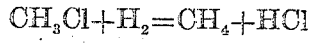

In such cases the hydrogen reduces the organic compound and forms an acid. Such compounds are in general not decomposed by water at ordinary temperatures.

2. Among the compounds which act by removing from the electrolyte a material which forms a base with the hydroxyl group, the following are typical:—

Alkyl halids, such as ethylchlorid, bromid, or iodids and the like, whose action under certain conditions is shown.

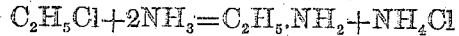

An amin and a salt are formed in this case. Acid chlorids, such as acetyl chlorid give a similar reaction.

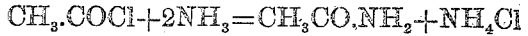

3. The classes of compounds which, although they may not be actually reducible by hydrogen under the conditions in the cell, become unstable as the hydroxyl ion concentration increases, are of great importance. They typify the third important way in which organic compounds combat basicity, namely by absorption of hydroxyl with the simultaneous freeing of an acid forming material.

The following compounds for instance vary greatly in their ease of decomposition by hydroxyl ions, and are given in a decreasing order of stability on treatment with water.

Benzyl chlorid, $C_6H_5.CH_2Cl$, is very slowly decomposed by water into benzyl alcohol and hydrochloric acid.

$$C_6H_5.CH_2Cl + H_2O = C_6H_5CH_2OH + HCl$$

Benzal chlorid is more rapidly decomposed into benzaldehyde and hydrochloric acid.

$$C_6H_5.CHCl_2 + H_2O = C_6H_5.COH + 2HCl$$

Benzotrichlorid, $C_6H_5CCl_3$, is decomposed by water into two acids, benzoic and hydrochloric.

$$C_6H_5.CCl_3 + 2H_2O = C_6H_5.COOH + 3HCl$$

Benzoyl chlorid gives by a similar reaction the same products.

The acid chlorids, such as acetyl chlorid, the chlorhydrins, such as trichlorhydrin, and many others, react similarly.

The above mentioned halogen derivatives of benzene, as well as many others, are rendered more available for combining with hydrogen if one or more of the substitutions are nitro groups.

4. The fourth important mode of action is obtained with compounds which consist of a weak organic base combined with an acid. The characteristic of such materials is the fact that they contain an entire acid molecule loosely combined; that is, the base is not strong enough to decompose the acid, but simply holds it and reduces its reactivity below normal. This class may be typified by the hydrochlorids. Of the latter a particular example is anilin hydrochlorid, $C_6H_5.NH_2.HCl$.

The action in such a case is resistance to an increase in alkalinity through a reaction similar to the following.

$$2C_6H_5.NH_2.HCl + Zn(OH)_2 =$$
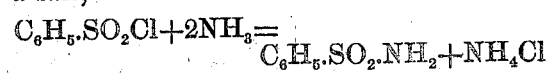

In general it is difficult to determine whether a given material acts in but one or in more than one of the described ways. It is probable that usually the reaction is a combination of more than one. For instance, acetyl chlorid was given as an example under two manners of reacting.

Benzene sulfone chlorid, $C_6H_5.SO_2Cl$, also shows how this can occur. This compound gives the following reactions.

1. With water to form benzene sulfonic acid, and hydrochloric acid, $$C_6H_5.SO_2Cl + H_2O = C_6H_5.SO_2.OH + HCl$$

2. Under the influence of ammonia, to absorb the base forming group and to form a salt, $$C_6H_5.SO_2Cl + 2NH_3 =$$

I have dealt mainly with halogen derivatives, and particularly with those containing chlorin, because they are of the most practical importance. The case is not confined to such, for by proper selection of materials, acids other than hydrochloric can be obtained.

In putting these organic compounds into use in batteries care must be taken to make a proper selection of material, particularly with respect to solubility in the electrolyte, and hydrogen ion concentration in the electrolyte. These requirements can in many cases be considerably modified by using two or more organic materials together, as for instance using a mixture of two such compounds as carbon tetrachlorid and benzoyl chlorid, one of which is decomposed with greater difficulty, the object being to obtain a mixture whose degree of stability is different from that of any single constituent.

In some cases it is necessary or advantageous to use in conjunction with the organic acidifier an oxidizing material as a depolarizer in the cell to take care of part or all of the discharged hydrogen.

There would be no one specific way of incorporating these organic compounds into the battery, but in dry cells by way of example, they may be put in the graphite mix or even absorbed by the carbon electrode.

Having described my invention, what I claim is:—

1. In an electric battery, the combination with an electrolyte which tends to become progressively more basic during the life of the battery, of an organic substance adapted to reduce the rate at which such basicity develops.

2. In an electric battery, the combination with an electrolyte which tends to become progressively more basic during the life of the battery, of a halogen-containing organic substance adapted to reduce the rate at which such basicity develops.

3. In an electric battery, the combination with an electrolyte which tends to become progressively more basic during the life of the battery, of an organic substance adapted to form an acid under the action of nascent hydrogen and thus reduce the rate at which such basicity develops.

4. In an electric battery, the combination with an electrolyte which tends to become progressively more basic during the life of the battery, of a halogen-containing organic substance adapted to form an acid under the action of nascent hydrogen and thus reduce the rate at which such basicity develops.

In testimony whereof, I hereunto affix my signature.

HARRY F. FRENCH.